United States Patent [19]
Ball et al.

[11] Patent Number: 5,360,556
[45] Date of Patent: Nov. 1, 1994

[54] METHOD OF FEEDING WASTEWATER EFFLUENT TO FILTER BED THROUGH PARALLEL CONDUITS

[75] Inventors: Harold L. Ball; Terry R. Bounds; Eric S. Ball; Jeffrey L. Ball, all of Roseburg, Oreg.

[73] Assignee: Orenco Systems, Inc., Roseburg, Oreg.

[21] Appl. No.: 926,463

[22] Filed: Aug. 7, 1992

[51] Int. Cl.[5] .............................................. B01D 21/00
[52] U.S. Cl. ...................................... 210/804; 137/1; 138/104; 405/40; 405/44; 405/48; 405/51; 210/90; 210/258
[58] Field of Search .................. 210/90, 258, 259, 265, 210/291, 532.1, 532.2, 669, 741, 747, 804, 617, 170; 405/36, 37, 39, 40, 41, 42, 43, 44, 45, 48, 51; 138/104, 109; 137/1

[56] References Cited

U.S. PATENT DOCUMENTS

| | | | |
|---|---|---|---|
| 649,411 | 5/1900 | Jewell | 210/277 |
| 848,279 | 3/1907 | Ashley | 210/291 |
| 962,606 | 6/1910 | Wiest | 210/265 |
| 1,784,893 | 12/1930 | Duden | 210/291 |
| 2,092,716 | 9/1937 | Hungerford et al. | 210/291 |
| 2,439,764 | 4/1948 | Walker | 210/291 |
| 2,605,901 | 8/1952 | Morrison et al. | 210/291 |
| 2,795,542 | 6/1957 | Horne et al. | 210/747 |
| 3,954,612 | 5/1976 | Wilkerson | 405/43 |
| 4,251,359 | 2/1981 | Colwell et al. | 210/617 |
| 4,439,323 | 3/1984 | Ball | 210/744 |
| 4,681,677 | 7/1987 | Kuh et al. | 210/88 |
| 4,721,408 | 1/1988 | Hewlett | 405/51 |
| 4,971,690 | 11/1990 | Justice | 210/258 |
| 5,108,614 | 4/1992 | Ross et al. | 210/283 |

FOREIGN PATENT DOCUMENTS 2914207 10/1980 Germany ........................... 138/104

OTHER PUBLICATIONS

Gravity Sanitary Sewer Design and Construction; ASCE Manuals and Reports on Engineering Practice No. 60; WPCF Manual of Practice No. FD-5 (1982) p. 122, title page and page ii.

Primary Examiner—Joseph W. Drodge
Attorney, Agent, or Firm—Chernoff, Vilhauer McClung & Stenzel

[57] ABSTRACT

An on-site wastewater treatment system distributes septic tank effluent over a particulate media filter bed through a distribution manifold at a sufficient volumetric flow rate relative to the cross-sectional area of the distribution conduits to inhibit undesirable biological growth in the conduits and in the filter by creating a scouring effect in the conduits. This effect prevents clogging of the conduits and maximizes the even distribution of effluent in the filter. A mesh fabric intercepts the downward flow of the effluent in the filter to further aid in the even distribution of effluent in the filter. Orifice shields also aid in such distribution by preventing clogging of orifices embedded in the filter media. A high pressure switch in the distribution manifold and a high water alarm in the filter pump basin indicate when required maintenance is necessary, and the switch controlling the high water alarm temporarily disables the septic tank pump as well. A flush system is provided to easily remove any clogging solid material from the distribution manifold.

12 Claims, 3 Drawing Sheets

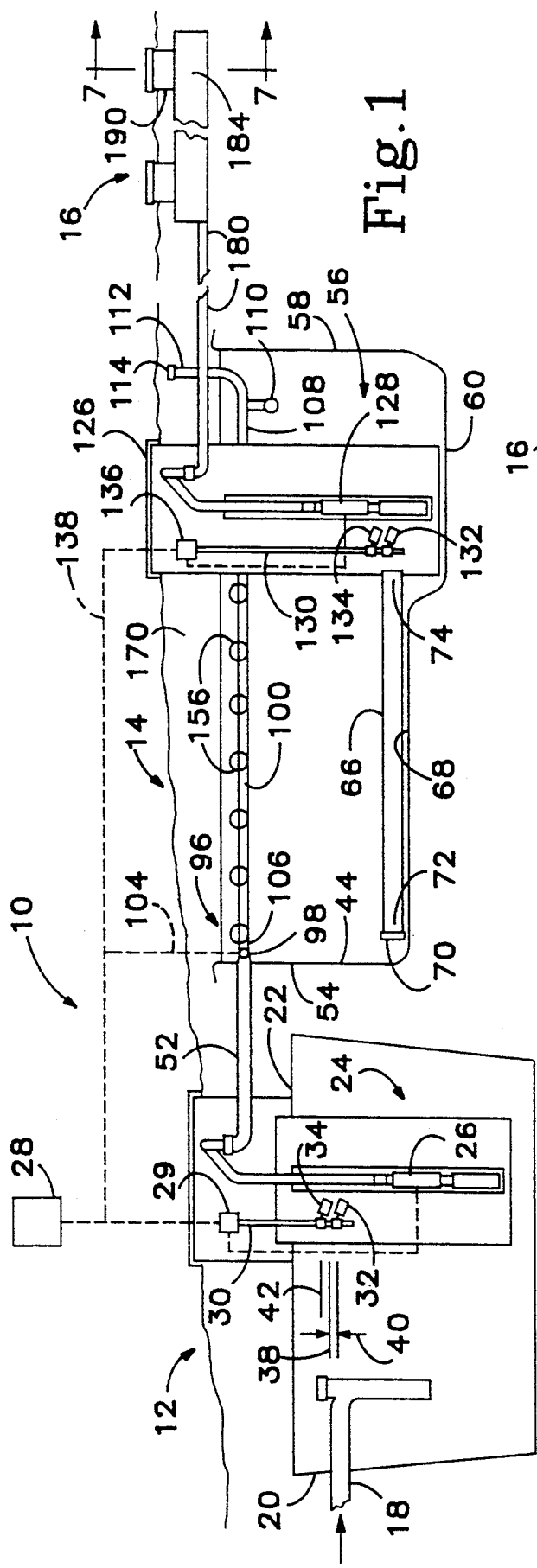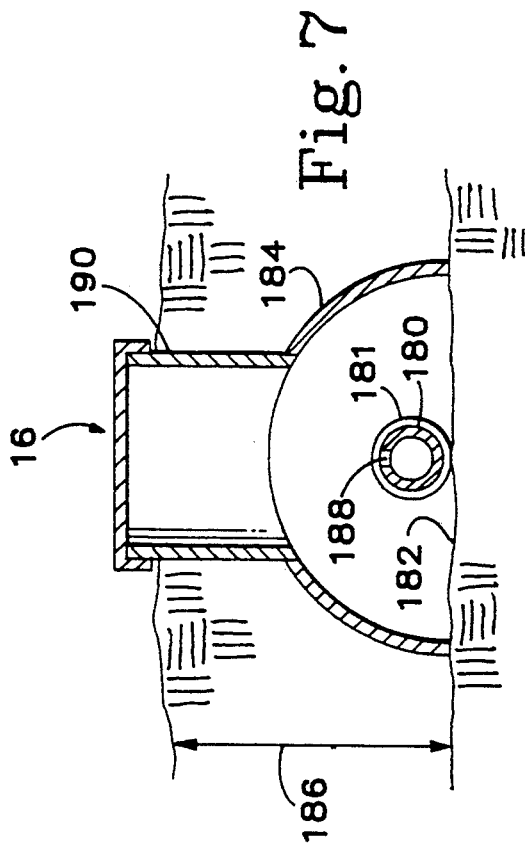

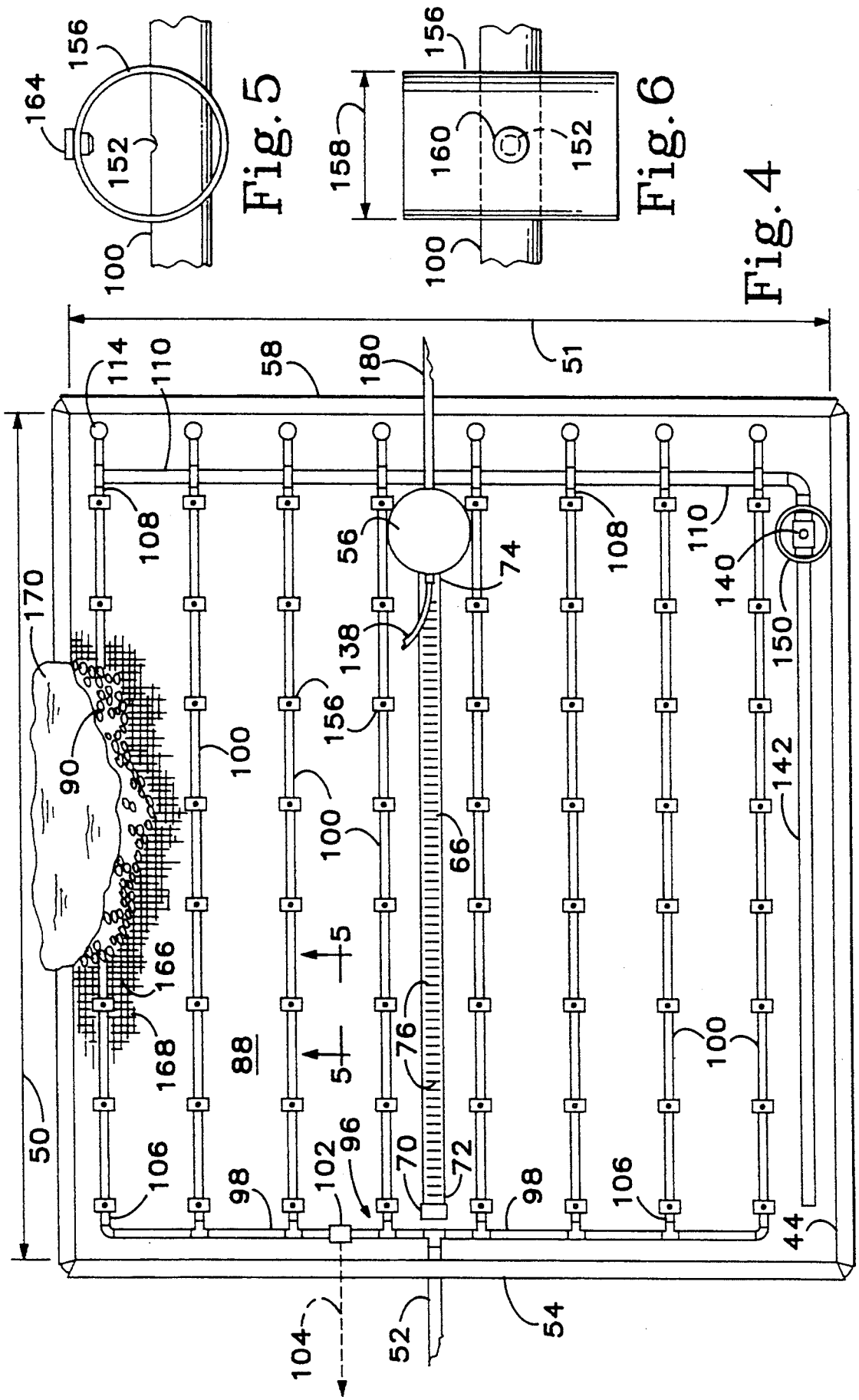

1

METHOD OF FEEDING WASTEWATER EFFLUENT TO FILTER BED THROUGH PARALLEL CONDUITS

BACKGROUND OF THE INVENTION

This invention relates to wastewater treatment systems, and more particularly to wastewater treatment systems for treating liquid from which solids have been removed by gravitational separation, such as the effluent from a septic tank, prior to on-site disposal.

Where soil conditions will not permit use of a seepage field system for the direct disposal of wastewater from which solids have been gravitationally removed, some type of preliminary treatment system must be used prior to the on-site disposal of the wastewater. Such a preliminary treatment system often includes a particulate media filter because a particulate media filter is economical to install and requires minimal maintenance compared to other preliminary treatment methods.

The particulate media filter treats wastewater, typically septic tank effluent, by removing additional particulate matter and biodegradable material by a combination of mechanical filtration and aerobic biological activity. The filter media is a particulate material such as sand which serves as a support conducive to the growth and maintenance of aerobic organisms. Septic tank effluent, deposited in or on the filter media, is allowed to flow by gravity down through the media. As the effluent flows through and around the media particles, the biological activity of the aerobic organisms supported by each particle degrades organic material present in the effluent. In addition to the biological activity, larger solid materials present in the effluent tend to remain in the media interstices as the effluent passes through the filter.

The most common problem associated with a particulate media filter is the undesirable growth of anaerobic biological organisms. Such anaerobic growth tends to accumulate in the distribution system of pipes feeding the septic tank effluent to the filter, as well as in the filter itself. The undesired biological growth can clog the orifices in the distribution pipes in the absence of frequent maintenance, inhibiting the even distribution of effluent through the filter and interfering with the efficiency of the filter. Biological overloading of the portion of the filter not having clogged orifices accelerates anaerobic growth in and on the filter media. With time, the anaerobic organisms, which break down organic matter at a rate many times slower than aerobic organisms do, crowd out the aerobic ones and the filter can no longer sufficiently treat the daily wastewater flow for which it is designed.

Despite the persistence of these problems, prior wastewater filtering systems have been unable to effectively inhibit such undesirable biological growth. Because of the aforementioned distribution pipe clogging problem, in a typical filter the orificed pipes for distributing effluent over the filter are normally selected on the basis of the largest diameter pipes that are economically feasible. Thus, orificed distribution pipes having a nominal 1¼ to 2 inch diameter are commonly used in such filters, in the belief that the large cross-sectional area of the pipes will minimize clogging and maximize the uniformity of effluent distribution. Nevertheless, such filters regularly lose their efficiency or fail because of clogging biological growth in the pipes and filter beds.

Accepted standards for large-diameter pipes in sanitary sewers dictate a design velocity of not less than 0.60 m/sec (2 feet per second) or generally greater than 3.5 m/sec (10 feet per second) at peak flow. The minimum velocity requirement is necessary to prevent the deposition of raw sewage solids, as explained in *Gravity Sanitary Sewer Design and Construction,* No. 60 ASCE Manuals and Reports on Engineering Practice and No. FD-5 WPCF Manual of Practice 122 (1982). However, because such solids have been gravitationally removed from septic tank effluent, such reason for a minimum velocity in a wastewater treatment filter system for septic tank effluent is inapplicable. Accordingly, no reason has existed in the past for filter designers to consider reducing the cross-sectional area of the filter distribution pipes to increase effluent velocities, especially in view of the belief that such reduction would contribute to clogging.

What is still needed, therefore, is a septic tank effluent treatment system with an easily maintained particulate media filter that minimizes the undesirable biological growth in the system conduits and particulate media while maximizing filter efficiency through even distribution of effluent in the filter.

Morrison, et al., U.S. Pat. No. 2,605,901; Hungerford, et al., U.S. Pat. No. 2,092,716; and Jewell, U.S. Pat. No. 649,411 disclose the use of screens between the layers of a filter. None of these screens, however, is properly located or has a mesh size small enough to aid in the even distribution of gravity-flow effluent in a particulate media filter.

Kuh, et al., U.S. Pat. No. 4,681,677 discloses a pressure differential sensor for use with a drinking water processor device. When the pressure differential between the inlet and outlet of a filter is large enough, indicating that the filter has failed and must be replaced, a shut-off valve or bypass device is activated to interrupt or intercept the effluent flow of water. Such a system, however, does not address the problem of clogging of the distribution system of a wastewater particulate media filter, nor enable correction of the problem prior to filter failure.

Duden, U.S. Pat. No. 1,784,893 discloses water treatment apparatus that includes relatively large intake nozzles imbedded a slight distance below the top level of a filter bed when no water is passing therethrough. The relatively large mouth of each intake nozzle is covered by a metal plate having a large number of cylindrical orifices of such size as to prevent the passage into the nozzles of any filter media as water flows through the bed in an upward direction. However, there is no suggestion as to how clogging of the imbedded orifices with filter media particles can be avoided.

Walker, U.S. Pat. No. 2,439,764 discloses water treatment apparatus having distributor arms provided with a plurality of orifices and rotating above a filter bed. An aerator plate, adjustably carried by a bracket, is located in front of each orifice. However, the aeration function precludes imbedding of the orifices in the filter media, and therefore does not present a problem of orifice clogging with filter media particles.

SUMMARY OF THE INVENTION

The problems associated with the use of a particulate media filter, as a preliminary treatment system for wastewater effluent from which solids have been removed by gravity separation, are addressed in the present invention by distributing effluent over a media filter bed through distribution conduits under linear scouring velocity conditions that inhibit undesirable biological growth in the filter and distribution system. The term "linear scouring velocity" as used herein is the volumetric flow (e.g., cubic feet per second) divided by the internal cross-sectional area of the conduit (e.g., square feet).

Wastewater effluent, from which solids have been removed by gravity separation, is fed to a filter bed composed of particulate media and distributed over the filter bed in a parallel manner through a plurality of elongate distribution conduits having orifices spaced longitudinally along each conduit. The effluent flows through each conduit from a first end to a second end thereof at a sufficient volumetric flow rate relative to the cross-sectional area of the conduit to cause a linear scouring velocity longitudinally of each conduit proximate the first end of each conduit of between about 2.5 and 7 feet per second. Such a linear scouring velocity requires distribution conduits having a smaller cross section than has been considered adequate in the past. In fact, in comparison to conventional practice, the small size of the distribution conduits may appear to be counterproductive to the prevention of clogging and the even distribution of effluent. However, such arrangement imparts to the effluent characteristics such as turbulence, shear and velocity that effectively inhibit biological growth in the conduits and filter, without requiring such a high pressure drop in the conduits that uniformity of effluent distribution is materially affected. Small size distribution conduits also provide less internal surface area on which undesirable growth can occur.

The effluent can either be prevented from flowing through the second end of each distribution conduit, for normal operation, or it can selectively alternatively be permitted to flow temporarily through the second end of each conduit so as to flush solids out of each conduit. Thus, any solid material or undesirable biological growth which may develop in the conduit can be easily removed before the conduit becomes clogged.

The effluent is fed to the filter bed distribution conduit system by means of a pump. As the effluent is distributed over the filter bed through the conduits, the pressure of the effluent in the conduits is sensed. If the pressure exceeds a predetermined limit an alarm is selectively activated, indicating a need for performing maintenance procedures such as flushing the conduits. Maintenance is performed only as needed, but prior to filter failure.

As the effluent flows from the orifices in the distribution conduits down through the filter bed by gravity, it is intercepted by a mesh material having a plurality of mesh apertures sufficiently small to retard the downward flow of effluent. By retarding the effluent flow, the mesh causes the effluent to spread out, thereby aiding in the even distribution of the effluent in the filter bed to maximize filter efficiency.

After flowing through the filter bed the effluent is collected and then transported for on-site disposal. The accumulated volume of the collected effluent is monitored so that if the volume exceeds a predetermined volume, indicating a failure in the downstream transport systems or on-site disposal system, the operation of the pump feeding the effluent to the filter bed is selectively interrupted. The delivery of the effluent to the filter for treatment ceases, and the filter is protected from being overloaded with effluent.

Each orifice spaced longitudinally along each distribution conduit is shielded from contact with the particulate media composing the filter bed, even though the orifices are imbedded in the media. Even distribution of effluent over the filter bed is thus further aided by preventing the media particles from clogging each orifice.

It is therefore a principal object of the present invention to provide a particulate media filter system for septic tank effluent that inhibits undesired biological growth in the system.

It is a related object of the present invention to provide such a treatment system that maximizes the even distribution of effluent over the filter bed of the system.

It is a further object of the present invention to provide such a treatment system that minimizes the maintenance requirements for the system.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a schematic view of an exemplary wastewater treatment system embodying the present invention.

FIG. 4 is an enlarged top plan view of the filter shown in FIG. 1 with all but a portion of the material covering the filter broken away.

FIG. 5 is an enlarged side elevational view of a portion of a distribution conduit taken along line 5—5 of FIG. 4.

FIG. 6 is a top plan view of the portion shown in FIG. 5.

FIG. 7 is an enlarged sectional view taken along line 7—7 of FIG. 1.

DETAILED DESCRIPTION OF THE PREFERRED EMBODIMENT

Figures 2, 3:
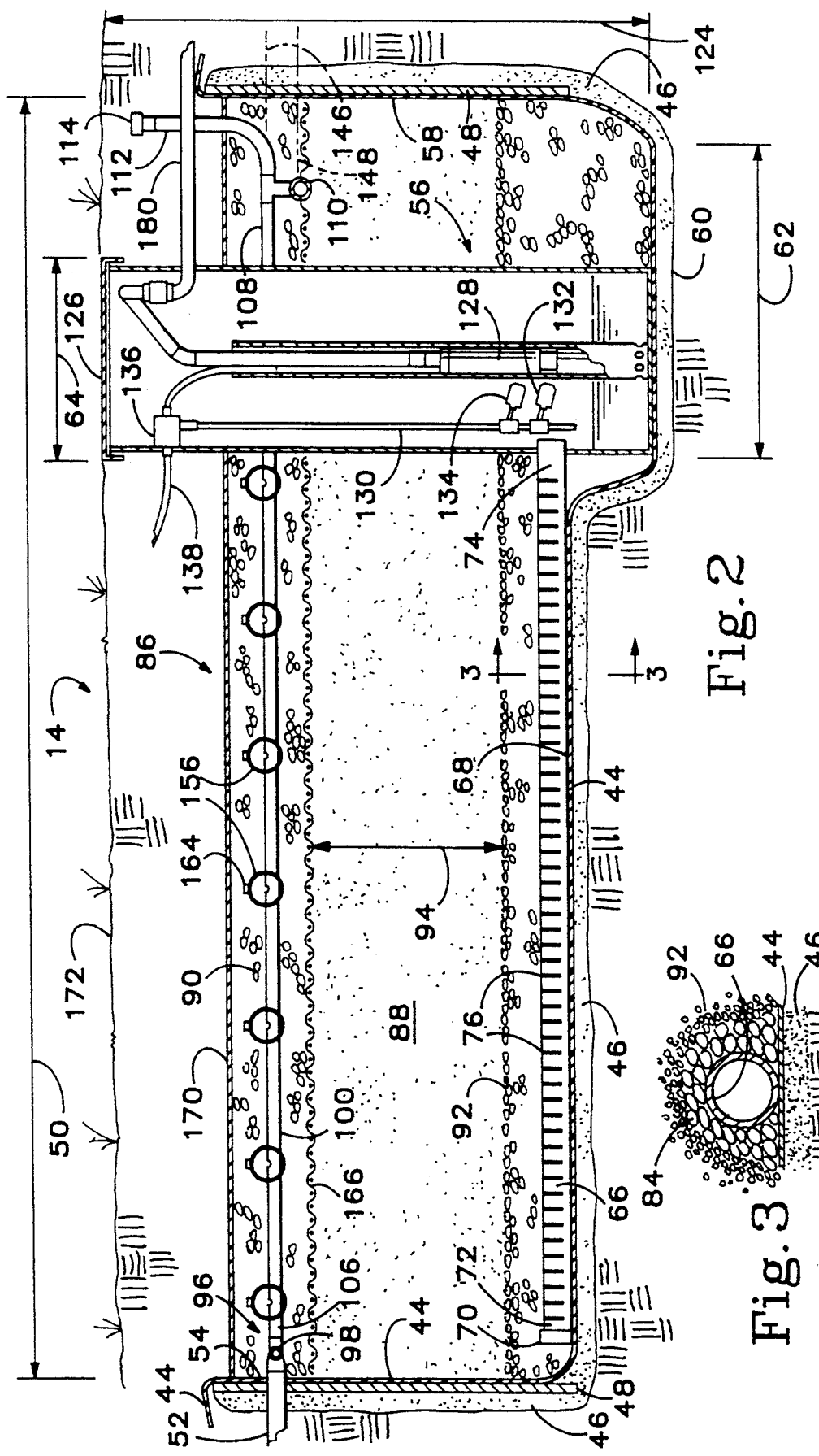
FIG. 2 is an enlarged sectional side elevational view of the particulate media filter shown in FIG. 1.
FIG. 3 is an enlarged sectional view taken along line 3—3 of FIG. 2.

Referring now to the drawings, a preferred embodiment of an on-site wastewater treatment system 10 includes a septic tank 12, a particulate media filter 14, and a drain field disposal trench 16, as shown in FIG. 1. The septic tank 12 typically receives the wastewater from a residence and is sized in relation to the size of the residence. For example, the septic tank for a two-bedroom home typically has a 1000 gallon capacity. The septic tank receives the wastewater through an inflow pipe 18 at an inlet end 20. An outlet end 22 of the septic tank is fitted with a screened pumping assembly 24. Such a pumping assembly is disclosed more completely in U.S. Pat. No. 4,439,323 which is hereby incorporated by reference. A dosing pump 26 pumps increments of effluent, that is, the wastewater from which solids have been gravitationally separated, from the septic tank.

A control panel 28 controls the operation of the dosing pump through a splice box 29 in response to a float assembly 30 including an on/off float control 32 and an alarm float control 34. The on/off float control 32 maintains the liquid level 38 in the septic tank within certain preset limits 40. The control panel is preferably timer operated, such as the control panel Model SSF-1PT with MF-AF float assembly marketed by Orenco Systems, Inc. of Roseburg, Ore., in order to provide frequent, uniform doses of effluent to the extent permitted by the float control 32. For example, at a pumping rate of 27 gallons per minute (gpm) and a dosing rate of 48 doses per day, the dosing cycle for dosing about 200 gallons per day (gpd) is 10 seconds pump "on" and 29 minutes 50 seconds pump "off." The alarm float control 34 indicates when the level of liquid in the tank reaches the level set as the alarm level 42.

As best shown in FIGS. 2 and 4, the filter, having a size adequate to receive the anticipated volume of wastewater effluent, has a 30 mil thick polyvinylchloride (PVC) liner 44 resting on a sand leveling layer 46 and supported by a perimeter support frame 48. A particulate media filter is typically loaded at a rate of up to 4 gallons per square foot per day, so a filter having a length 50 and width 51, respectively, each of about 10 feet is adequate for the amount of effluent from a 1,000 gallon capacity septic tank delivered at the pumping rate previously described. A transport conduit 52 from the septic tank is connected at an inflow end 54 of the filter. A pump basin 56 is located at a second, and generally opposite, end 58 of the filter in a depression 60 having a diameter 62 larger than the diameter 64 of the pump basin. For example, a 24 inch diameter depression is adequate for a 15 inch diameter pump basin.

The pump basin 56, of a height 124 sufficient to be accessible from the surface through a lid 126, contains a submersible pump 128 and a float assembly 130 that includes an on/off float control 132 for controlling the pump 128 through a splice box 136, and an alarm float control 134. The float assembly 130 is also electrically connected to the septic tank control panel 28 through the splice box 136 and electrical conduit 138, as best shown in FIG. 2, for purposes to be described hereafter. A suitable pump and float assembly is the Model 20 OSI 05 pump with MF-AF float assembly marketed by Orenco Systems, Inc. of Roseburg, Ore.

An underdrain 66, of a suitable size and material such as a 4 inch class 125 PVC pipe, is located at the bottom 68 of the filter. The underdrain 66 has a cap 70 at one end 72 and is connected at the other end 74 to the pump basin 56. Each of a plurality of slots 76 in the underdrain has a predetermined width, depth, and on-center separation distance between adjacent slots. For example, the slots may be cut ¼ inch wide, 2½ inches deep, and about 4 inches on-center. A cover 84 of suitable filter media such as ½ inch round rock is mounded over the underdrain, as shown in FIGS. 2 and 3.

The filter bed 86 is composed of particulate media, having at least one support layer 88 suitable for the support and growth of the aerobic organisms which are capable of the biological degradation of anaerobic organisms and organic material such as are found in the septic tank effluent. One such suitable media is sand having an effective size about equal to 0.6 mm and a uniformity coefficient less than 3. Other particulate materials may also be used as the support layer, including beads or pellets of polymeric materials such as polystyrene, polypropylene, or polyethylene. The layer 88 of particulate media suitable for the support of aerobic organisms is generally located between two layers, a top layer 90 and a bottom layer 92, of particulate media such as pea gravel, each of the two layers having a different, generally larger, effective particle size than the layer 88. The layer 88 has a depth 94 sufficient to insure that the time the effluent is in contact with the aerobic organisms will permit adequate treatment of the effluent as it flows by gravity through the particulate media.

A distribution manifold 96, of suitable size and material, consists of a header conduit 98 and distribution lateral conduits 100, as best shown in FIGS. 2 and 4. The distribution manifold is connected through the header conduit 98 to the transport conduit 52 from the septic tank. The header conduit 98 is located generally parallel to the inflow end 54 of the filter and contains a pressure sensor such as a pressure indicator switch 102 located proximate the connection of the distribution manifold to the transport conduit 52. A suitable electrical connection 104 connects the pressure indicator switch to the control panel 28 of the septic tank for reasons to be described hereafter. Each elongate distribution lateral conduit 100 is connected transversely at a first end 106 to the header conduit 98, and at a second end 108 to a flush conduit 110. The second end 108 of each distribution lateral conduit terminates in a cleanout riser 112 having a threaded cap 114, as shown in FIGS. 1, 2 and 4. An acceptable clean-out riser and cap is a 6-inch radius PVC pipe with a PVC cap.

The distribution manifold, and in particular the distribution lateral conduits 100, are preferably embedded in a particulate media layer, and most preferably are located in the approximate center of the layer 90 located above the layer 88 of particulate media suitable for the support of the aerobic organisms. Each distribution lateral conduit has a diameter that is generally smaller than the diameter of the header conduit 98, which in turn is smaller than the diameter of the transport conduit 52. For example, the transport conduit 52 may be 1 inch or 1¼ inch diameter class 200 PVC, the header conduit 98 may be ¾ inch diameter schedule 40 PVC, and the distribution lateral conduits 100 may be ½ inch diameter schedule 40 PVC pipe.

The flush conduit 110, attached to the second end 108 of each distribution lateral conduit 100, is located generally parallel to the second end 58 of the filter. The flush conduit is connected by means of a flush valve 140 to a drain line 142. The drain line preferably defines regularly spaced apart slots (not shown) oriented downwardly to permit liquid to drain by gravity from the slots into the filter. The flush conduit and drain line, of suitable size and material, are preferably located in the same particulate media layer as the attached distribution lateral conduits. The distribution lateral conduits preferably generally define a first plane 146 (FIG. 2), and the flush conduit and drain line generally define a second plane 148 located generally below the first plane. A suitable flush conduit is a 2 inch diameter class 200 PVC pipe. A suitable drain line is a 2 inch slotted PVC pipe having ¼ inch wide slots 4 inches on center. An access riser 150 having a cover (not shown) is associated with and surrounds the flush valve 140.

As best shown in FIGS. 2 and 5–6, a plurality of orifices 152 is spaced longitudinally along each distribution lateral conduit 100. Each orifice has a diameter that is approximately equal in size to, or larger than, the largest solid expected to be present in the effluent from the septic tank. A preferred orifice size is ⅛ inch diameter. The on-center spacing of the orifices 152 is preferably 15 inches.

An orifice shield 156 shields each orifice 152 from contact with the particulate media layer in which the distribution lateral conduits are embedded, as shown in FIGS. 1, 2 and 4–6. The orifice shield is a separate section of conduit of suitable size and material and having a diameter 158 larger than the diameter of the distribution lateral conduit 100 containing the orifice 152. As shown in FIGS. 5 and 6, the distribution lateral conduit 100 is transversely inserted through apertures in the orifice shield 156. The orifice shield contains an aperture 160 having a plug 164 removably inserted into the aperture for selective opening and closing of the aperture. The aperture 160 in each orifice shield is oriented upwardly to enable a person to view the respective shielded orifice when the aperture is open. Thus, during the installation of the distribution manifold in the particulate media layer, each orifice can be examined for desired performance through the opened aperture, which is then closed prior to the completion of the installation.

A mesh material 166, such as a mesh fabric or screen, is located in the filter in a position to intercept the effluent as it is distributed in the filter as will be discussed in greater detail below. A preferred location for the mesh material is immediately above the media layer 88 supporting the aerobic organisms. The mesh material has mesh apertures 168 that are sufficiently small to retard the flow of water or effluent therethrough; for example, a screen having $\frac{1}{8}$ inch mesh is suitable.

The filter bed is typically covered with filter fabric 170 and finally with a soil cover 172 of suitable depth and having a composition permitting air permeation such as a sandy loam or a suitably air-permeable lawn turf. The pump basin lid 126, each distribution lateral clean-out riser cap 114, and the lid (not shown) of the flush valve riser 150 are accessible at the surface, or slightly below the surface, of the soil cover.

In operation, the dosing pump 26 pumps the effluent from the septic tank 12 to the particulate media filter 14 in substantially uniform increments at frequent, regular time intervals, as previously described, through the transport conduit 52, and feeds it to the header conduit 98 at the inflow end 54 of the filter. The effluent is conducted in a parallel manner through the plurality of elongate distribution lateral conduits 100 from the first end 106 to the second end 108 of each conduit, and is distributed over the filter media from the plurality of orifices 152 spaced longitudinally along each distribution lateral conduit. Normal operating pressure in the distribution manifold is in the range of about 5-10 feet of water at each open orifice 152, and typically is about five feet of water.

The above-described volumetric flow rate of the dosing pump 26 at the described preferred diameter of the eight distribution lateral conduits 100 results in a linear scouring velocity at a location in each conduit 100 proximate its first end, that is, within the first half of each conduit and preferably proximate the orifice nearest the header conduit, of between about 2.5 and 7 feet per second. For example, in a distribution lateral conduit 100 having an actual internal diameter of 0.622 inches and with orifices spaced apart 1.25 feet, each orifice having a 0.125 inch diameter, the linear scouring velocity in a 10-foot-long distribution lateral conduit having eight orifices is about 4 feet per second proximate the orifice nearest the header conduit; and in a 15 foot-long distribution lateral conduit of approximately the same internal diameter, orifice spacing and orifice diameter, and having 12 orifices, the linear scouring velocity is about 6 feet per second proximate the orifice nearest the header conduit. When the effluent is distributed under such conditions the scouring effect on the distribution lateral conduits inhibits undesired biological growth in the conduits. Despite the pressure drop resulting from this linear scouring velocity, deviation in the volumetric distribution between an orifice nearest the header conduit and an orifice nearest the flush conduit is no more than about 10%.

The effluent flows through each distribution orifice 152 into the orifice shield 156 and then downwardly through the layer 90 of pea gravel by gravity, absorbing oxygen as it flows therethrough. The oxygen is necessary for the aerobic digestion that occurs in the filter. The effluent is intercepted by the mesh material 166 having apertures 168 therein small enough to retard the downward flow of the effluent. The effluent thus tends to spread out on the mesh surface before being wicked into the layer 88 of sand located below the mesh material. The orifice shields and the mesh material thus aid in the even distribution of the effluent over the layer of sand. In addition, the orifices 152 are spaced along the distribution lateral conduits so that effluent is distributed evenly over the sand media layer. The ideal orifice spacing insures that the orifices are not so far apart that some of the surface of the sand media layer does not receive any effluent, nor so close together that a portion of sand receiving effluent from one orifice also receives effluent from a second adjacent orifice.

The effluent flows through the layer 88 of sand to the layer 92 of pea gravel located therebelow, into the slotted underdrain 66 located therein, and into the pump basin 56. The on/off float control 132 in the pump basin is set to switch the pump 128 "on" and "off" to draw the liquid level in the layer 92 of pea gravel down a predetermined amount. Drawing the liquid level down about 1½ inch pumps about 30 gallons of treated effluent per pumping cycle from the particulate media filter. The alarm float control 134 in the pump basin is activated by a predetermined liquid level in the layer of pea gravel that is higher than the "on" level and operates through electrical conduit 138 to temporarily disable the septic tank dosing pump 26. The filter is thus protected from being overloaded since no additional effluent from the septic tank will be dosed to the filter until any necessary maintenance has been performed.

The pressure indicator switch 102 in the header conduit 98 is activated if the input pressure to the distribution lateral conduits 100 exceeds a predetermined pressure for a predetermined length of time. For example, a time delay of between 0 and 15 seconds will compensate for any transient excessive pressures sensed at the beginning of each dosing pump cycle, which depend on the transport conduit volume, pump model and elevation difference between the dosing pump and the media filter. The pressure indicator switch will preferably be adjustable to activation in the range of between about 8 feet and 20 feet of water pressure. Activation of the pressure indicator switch triggers a visual or an audio alarm at the control panel 28 indicating plugged orifices 152 or distribution lateral conduits 100 that require cleaning. Such cleaning can be performed by manually or automatically opening the flush valve 140 and activating the pump 26 for a predetermined period of time to permit the effluent to flow rapidly through the downstream ends of the distribution conduits and thence through the larger diameter flush conduit 110. Solid material is thus flushed out of the distribution lateral conduits and into the filter through the flush conduit 110 and drain line 142.

It will be apparent to one skilled in the art that the flush conduit could alternatively be plumbed to permit automatic or manually-activated backflushing of the distribution manifold to the septic tank for a predetermined period of time. In addition, each distribution lateral clean-out riser 112 provides access to a distribution lateral conduit for cleaning or pressure testing.

The pump basin submersible pump 128 pumps the treated and collected effluent to an on-site disposal area such as the drain field disposal trench 16 through a 1 inch diameter class 200 PVC disposal conduit 180 having a downstream end closed by a cap 181 (FIG. 7). The disposal trench contains the downstream end portion of the disposal conduit 180, such portion having a plurality of regularly spaced-apart, upwardly directed disposal holes 188. Inspection ports 190 of suitable size and material such as an 8 inch diameter PVC pipe are spaced regularly as required for inspection and ventilation. The disposal holes are typically 1/16 to ⅛ inch openings spaced apart from 1 to 6 feet. The spacing of the disposal holes and required trench length are determined by the soil type. Disposal trench loading rates are typically 2–15 gallons per square foot. No gravel is required to line the trench since the treated effluent is pumped the entire length of the disposal trench under pressure and, therefore, the entire bottom surface 182 of the trench receives treated effluent uniformly. The disposal trench 16 can be exceptionally narrow, being covered by a trench cover 184 such as one-half of a 12 inch diameter PVC pipe covered with native backfill to a suitable depth 186 such as 10 inches.

Alternative on-site disposal methods include subsurface turf and landscape irrigation. Surface discharge is possible if the treated effluent has been suitably disinfected such as with chlorine, ozone or UV irradiation and when regulated by an authorized jurisdiction.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of treating wastewater effluent comprising:
   (a) removing solids from said effluent by gravitational separation;
   (b) thereafter feeding said effluent to a filter bed comprised of particulate media;
   (c) during step (b), distributing said effluent over said filter bed by conducting said effluent in a parallel manner through a plurality of elongate conduits from a first end of each conduit toward a second end of each conduit, and distributing said effluent from each of said conduits through a plurality of orifices spaced longitudinally along each conduit; and
   (d) flowing said effluent through each of said conduits at a sufficient volumetric flow rate, relative to the cross-sectional area of each conduit, to cause a linear scouring velocity longitudinally of each conduit proximate said first end of each conduit of between about 2.5 and 7 feet per second.

2. The method of claim 1 wherein said flow rate is sufficient, relative to the cross-sectional area of each conduit, to cause a linear scouring velocity longitudinally of each conduit proximate said first end of each conduit of about 4 feet per second.

3. The method of claim 1 wherein said flow rate is sufficient, relative to the cross-sectional area of each conduit, to cause a linear scouring velocity longitudinally of each conduit proximate said first end of each conduit of about 6 feet per second.

4. A method of treating wastewater effluent comprising:
   (a) removing solids from said effluent by gravitational separation;
   (b) thereafter feeding said effluent to a filter bed composed of particulate media;
   (c) during step (b), distributing said effluent over said filter bed by conducting said effluent in a parallel manner through a plurality of elongate conduits from a first end of each conduit toward a second end of each conduit, and distributing said effluent from each of said conduits through a plurality of orifices spaced longitudinally along each conduit while preventing the flow of said effluent through the second end of each conduit; and
   (d) selectively, alternately flowing said effluent through the second end of each conduit so as to flush solids out of each conduit.

5. The method of claim 4, wherein step (d) includes exhausting said effluent from each conduit through the second end of each conduit and thereafter distributing said effluent from the second end of each conduit over said filter bed.

6. A method of treating wastewater effluent comprising:
   (a) removing solids from said effluent by gravitational separation;
   (b) thereafter feeding said effluent to a filter bed comprised of particulate media;
   (c) during step (b), distributing said effluent over said filter bed by conducting said effluent in a parallel manner through a plurality of elongate conduits from a first end of each conduit toward a second end of each conduit, and distributing said effluent from each of said conduits through a plurality of orifices spaced longitudinally along each conduit;
   (d) flowing said effluent from said orifices downwardly through said filter bed by gravity; and
   (e) intercepting said effluent from said orifices by means of a mesh screen material having a plurality of mesh screen apertures therein sufficiently small to retard the downward flow of said effluent, said mesh screen material having at least about a ⅛-inch mesh.

7. The method of claim 6 wherein step (e) includes intercepting said effluent with said mesh screen material at a location within said filter bed.

8. A method of treating wastewater effluent comprising:
   (a) removing solids from said effluent by gravitational separation;
   (b) thereafter feeding said effluent to a filter bed comprised of particulate media;
   (c) during step (b), distributing said effluent over said filter bed by conducting said effluent in a parallel manner through a plurality of elongate conduits from a first end of each conduit toward a second end of each conduit, and distributing said effluent from each of said conduits through a plurality of orifices spaced longitudinally along each conduit;
   (d) flowing said effluent from said orifices downwardly through said filter bed by gravity; and (e) intercepting said effluent from said orifices by means of a mesh material having a plurality of mesh apertures therein sufficiently small to retard the downward flow of said effluent, said mesh material having at least about a ⅛-inch mesh, wherein said filter bed has different media layers having different effective particle sizes, said method including flowing said effluent through a media layer having a first effective particle size, then through said mesh material, and then through a media layer having a second effective particle size smaller than said first effective particle size.

9. A method of treating wastewater effluent comprising:
   (a) removing solids from said effluent by gravitational separation;
   (b) thereafter feeding said effluent by means of a pump to a filter bed comprised of particulate media prior to on site disposal of said effluent;
   (c) during step (b), distributing said effluent over said filter bed by conducting said effluent in a parallel manner through a plurality of elongate conduits from a first end of each conduit toward a second end of each conduit, and distributing said effluent from each of said conduits through a plurality of orifices spaced longitudinally along each conduit;
   (e) sensing the pressure of said effluent in said conduits while feeding said effluent in step (b); and
   (e) selectively activating an alarm in response to said pressure exceeding a predetermined limit.

10. The method of claim 9, further including interposing a respective shield, having a selectively openable and closable aperture therein, between each of said orifices and said particulate media.

11. A method of treating wastewater effluent comprising:
   (a) removing solids from said effluent by gravitational separation;
   (b) thereafter feeding said effluent to a filter bed comprised of particulate media prior to on site disposal of said effluent;
   (c) during step (b), distributing said effluent over said filter bed by conducting said effluent in a parallel manner through a plurality of elongate conduits from a first end of each conduit toward a second end of each conduit, and distributing said effluent from each of said conduits through a plurality of orifices spaced longitudinally along each conduit; and
   (d) discharging said effluent from said orifices at locations embedded within said particulate media while shielding said orifices from contact by said media by interposing a non-particulate shield between each of said orifices and said particulate media.

12. A method of treating wastewater effluent comprising:
   (a) removing solids from said effluent by gravitational separation;
   (b) thereafter feeding said effluent to a filter bed comprised of particulate media;
   (c) during step (b), distributing said effluent over said filter bed by conducting said effluent in a parallel manner through a plurality of elongate conduits from a first end of each conduit toward a second end of each conduit, and distributing said effluent from each of said conduits through a plurality of orifices spaced longitudinally along each conduit; and
   (d) discharging said effluent from said orifices at locations embedded within said particulate media while shielding said orifices from contact by said media by interposing a respective shield, having a selectively openable and closable aperture therein, between each of said orifices and said particulate media.

* * * * *

UNITED STATES PATENT AND TRADEMARK OFFICE
CERTIFICATE OF CORRECTION

PATENT NO. : 5,360,556
DATED : November 1, 1994
INVENTOR(S) : Harold L. Ball, et al.

It is certified that error appears in the above-indentified patent and that said Letters Patent is hereby corrected as shown below:

Col. 10, line 10 : after bed replace composed with -- comprised --

Col. 11, line 27 : delete (e) and replace with -- (d) --

Signed and Sealed this

Twenty-fourth Day of January, 1995

Attest:

BRUCE LEHMAN

*Attesting Officer*   *Commissioner of Patents and Trademarks*